United States Patent
Bretscher et al.

(10) Patent No.: US 6,808,141 B2
(45) Date of Patent: Oct. 26, 2004

(54) PROPELLER-DRIVEN AIRCRAFT WITH ENGINE POWER SCHEDULING WITH INDICATED AIRSPEED

(75) Inventors: Dietmar Bretscher, Furigen (CH); William Tyndall, Sempach Stadt (CH)

(73) Assignee: Pilatus Flugzeugwerke AG, Stans (CH)

( * ) Notice: Subject to any disclaimer, the term of this patent is extended or adjusted under 35 U.S.C. 154(b) by 0 days.

(21) Appl. No.: 10/244,005

(22) Filed: Sep. 16, 2002

(65) Prior Publication Data
US 2003/0052224 A1 Mar. 20, 2003

(30) Foreign Application Priority Data
Sep. 15, 2001 (EP) .............................. 01122167

(51) Int. Cl.[7] .............................. B64C 11/34
(52) U.S. Cl. ..................... 244/76 R; 416/1; 416/27
(58) Field of Search .................. 244/76 R, 76 A, 244/76 B, 76 C, 62; 416/1, 27–30, 36–40, 44, 47, 48; 701/4, 7, 10, 919

(56) References Cited

U.S. PATENT DOCUMENTS

| | | | |
|---|---|---|---|
| 2,057,877 A | | 10/1936 | Bragunier |
| 4,884,205 A | * | 11/1989 | Hernandez-diaz ......... 244/76 R |
| 5,078,345 A | * | 1/1992 | De Vries et al. ............ 244/182 |
| 5,209,640 A | * | 5/1993 | Moriya ........................ 416/27 |
| 5,465,211 A | * | 11/1995 | Byrne, Jr. ..................... 701/14 |
| 5,997,250 A | * | 12/1999 | Carter, Jr. et al. ............ 416/27 |
| 6,224,021 B1 | | 5/2001 | Tanaka |
| 6,340,289 B1 | * | 1/2002 | Vos et al. ...................... 416/1 |

FOREIGN PATENT DOCUMENTS

| DE | 93 10 219.4 U1 | 1/1994 |
|---|---|---|
| EP | 0 410 162 A1 | 1/1991 |
| GB | 488740 | 7/1938 |

* cited by examiner

*Primary Examiner*—Galen Barefoot
(74) *Attorney, Agent, or Firm*—Browdy and Neimark, P.L.L.C.

(57) ABSTRACT

Propeller-driven aircraft (30) comprising an engine (31) providing mechanical engine power for rotating a propeller (32), an engine limiting unit (35), an engine control unit (37) for controlling the mechanical engine power of the engine (31), a system (36) for measuring the airspeed and providing information concerning the airspeed to the engine limiting unit (35), wherein the engine limiting unit (35) automatically reduces the mechanical engine power at airspeeds below a certain first airspeed value (V1).

14 Claims, 4 Drawing Sheets

PROPELLER-DRIVEN AIRCRAFT WITH ENGINE POWER SCHEDULING WITH INDICATED AIRSPEED

TECHNICAL FIELD

The invention relates to a propeller driven aircraft, and more particularly to a propeller driven aircraft with a tractor propeller arrangement—"tractor" meaning a propeller mounted in front of the engine which pulls the aircraft forward as opposed to one behind the engine which pushes the aircraft.

BACKGROUND ART

It is a characteristic of propellers that they are more efficient producers of thrust at low forward airspeeds than jet engines but, as forward speed increases, the efficiency and thrust of propellers drop rapidly. This means that propeller driven aircrafts accelerate more rapidly at low speeds but have a lower maximum speed than a jet powered aircraft of similar power. Rapid acceleration at low speed permits, during the takeoff manoeuvre, a propeller driven aircraft to achieve its minimum flying speed in a relatively short distance and therefore it can be operated from short runways.

At low speeds the higher efficiency of propellers (over jet engines) also causes less fuel to be consumed for a given manoeuvre than a jet engine. Therefore, where high speed is not a requirement, propeller engined aircrafts are less costly to operate.

Where high speed is required and longer landing distances can be tolerated (e.g., in personnel transport and in war planes) jet powered aircrafts are more common. Training aircrafts used to teach potential pilots the skills necessary to control their future operational machines are traditionally relatively slow aircrafts, giving trainees, who are unfamiliar with the environment in the air, time to learn the techniques to control the machines safely. Hence the domination of slow and propeller powered aircrafts in the trainer role.

However, with the advent of faster operational aircrafts, it has become advantageous to teach trainee pilots to operate at high speed as quickly as possible in order to reduce the cost of training. Up to the present time it has been necessary to give trainee pilots experience in high speed trainer aircrafts before permitting them to fly in operational aircrafts. This high speed training has traditionally been executed in another type of aircraft which is normally powered by a jet engine with attendant high operational costs.

With a high powered propeller engined training aircraft it is now possible to achieve the speeds that would make training realistic, but there are inherent problems for safe aircraft handling when high power is applied at low speed to a propeller driven aircraft. If these handling problems can be solved to make the aircraft safe to fly by inexperienced pilots at low speed it is advantageous to have combined in one aircraft, the power to operate at high speed and also the performance and cost benefits of using a propeller at low speed.

The invention addressed in this patent application makes it possible to operate safely at low and high speed in an aircraft using a high powered engine driving a propeller.

The problems of operating at low speed with a high powered propeller engine are discussed below.

A rotating propeller 10 produces thrust by accelerating a mass of air rearwards, as illustrated in FIG. 1. The higher the power of the engine the greater the mass, velocity and energy in this airflow. This airflow behind the propeller 10 is commonly called the propeller slipstream 11. The slipstream does not flow aft exactly parallel to the propeller shaft, but rotates around the aircraft longitudinal axis in the direction that the propeller 10 is rotating, resulting in a helical flow 11. On conventional aircraft, there is a fin 15 and rudder 14 combination mounted on the upper rear part of the fuselage. The purpose of this surface is to provide directional stability (like the feathers do at the back of an arrow). If the airflow over this surface is directly aft the stabilizing surface will function correctly and the aircraft 13 will fly straight. However, if the flow is not directly rearwards the vertical surface (which is behind the center of gravity of the aircraft 13) will generate a side force and cause the aircraft 13 to yaw (rotate around the vertical axis). This motion must be counteracted by the pilot moving the rudder. In a low powered aircraft this tendency to yaw is low and can easily be controlled. However, as power increases, the yawing effect becomes stronger and at high power levels can exceed the control authority available by the rudder 14, thus causing the pilot to loose control of the aircraft 13. This effect was often demonstrated in the highly powered WWII fighter aircraft, where inexperienced pilots not infrequently went off the side of the runway during takeoff. The standard technique in such aircraft is to apply power slowly, only achieving full power after a safe speed has been achieved when the aircraft is safely airborne.

An additional undesirable motion is caused by the secondary effect of yaw, which is roll. A conventional, certified aircraft will roll in the same direction as the aircraft yaws, the rapidity of roll increasing with the amount of yaw. During the takeoff, roll on the runway the aircraft will tend to turn off to one side, requiring a pilot action on the rudder 14 to keep straight. This tendency to yaw is damped by the friction of the wheels on the ground. At aircraft rotation to lift off the ground, the directional stability provided by the wheels is removed and the aircraft 13 yaws further and at the same time will roll in response to the sideslip (yaw). Also during airborne low speed, high power manoeuvres such as recovering from a stall, the aircraft 13 will yaw and roll in response to an application of power where the requirement is only for a linear acceleration. The higher the power level, the greater the tendency for the aircraft 13 to yaw and roll and the greater the problem for the pilot to maintain acceptable control of the machine.

An aircraft engine causes a propeller to rotate. There is a reaction between the propeller and the airframe in which the engine is mounted that causes the airframe to try and rotate in the direction opposite to the rotation direction of the propeller. The aerodynamic resistance to rotation of the propeller increases as the power developed by the engine and therefore the thrust developed by the propeller increases, which increases the tendency of the aircraft to roll. As mentioned above, on the ground this rolling tendency is resisted by the wheels, but causes a greater load to be applied on one main wheel than the other. The higher loaded wheel has more rolling resistance and the resulting drag causes the aircraft to turn, which must be corrected by the pilot. At aircraft lift off the resistance to rolling provided by the wheels disappears and the aircraft is now free to roll and at the same time the drag from the higher loaded wheel disappears so the correction applied by the pilot to resist this yaw must be removed at the same time as a movement is made with the ailerons to resist the tendency to roll.

Certification regulations and good handling characteristics require a particular aircraft response under given conditions. Two requirements that can be negatively influenced by high power are lateral stability and rudder authority. Lateral stability, as mentioned above requires that when an aircraft yaws to the right it should also roll right and similarly left yaw causes left roll. Directional stability requires that when an aircraft is trimmed to fly straight (i.e., without yaw) and the rudder 14 is deflected to yaw the aircraft 13 and then released, the aircraft yaw should reduce and return to the trimmed condition.

a) Lateral Stability: The design of a wing (normally incorporating dihedral or sweepback) achieves lateral stability. When an aircraft yaws (or sideslips) the wing towards which the aircraft is side slipping develops more lift and causes the aircraft to roll in the correct direction. At low or moderate power the airflow over the wing is not significantly modified by the propeller slipstream/engine thrust and the lateral restoring effect remains effective. At high power two effects may have a negative influence. First, the reaction between propeller and airframe, mentioned above, resists the wing restoring rolling effect. Second, the increase in airflow velocity behind the propeller causes more lift to be developed over the inboard part of the wing, which, particularly when the landing flaps are extended, negates the dihedral/sweepback effect. The combination of these two effects means that when high power is applied at low speed, the required lateral stability is difficult to achieve with normal design and at very high power levels it may not be possible without sophisticated artificial stability devices.

b) Rudder Authority: Simple mechanical controls—as found in light weight and slow speed aircraft—are moved by the pilot by means of the control column, but they are also influenced and moved by the flow of air over them. The neutral, or free position of the control surface is set by the position of its respective trimming tab or spring and the direction of airflow over it. The rudder 14, being mounted directly in the propeller slipstream 11 is affected by the helical flow and has a natural tendency to line up with this diagonal flow over the rear fuselage. The rudder 14 will only produce control effectiveness when moved away from this neutral position. In an aircraft 13 with a propeller 10 rotating clockwise when viewed from the rear the aircraft 13 will yaw to the left as power is applied requiring the application of right rudder 14 to keep it straight. At the same time the helical airflow 11 will cause the neutral position of the rudder 14 to be displaced to the right. To correct the left yawing tendency the rudder 14 must be displaced further right. As engine power is increased the left yaw increases and requires increased right rudder 14 deflection to counteract it. The power of the rudder 14 must always be greater than the yawing moment provided by the engine, otherwise control of the aircraft 13 will be lost. As rudder power is influenced by many conflicting requirements in the total aircraft design there is a limit to its authority that in turn limits the engine power that can safely be applied at low speed.

The side force generated by the fin 15 in the helical airflow 11 is modified by the rudder 14 to cause the aircraft 13 to fly in balance (without yaw or sideslip). As aircraft angle of attack (the angle between the aircraft longitudinal axis and the relative airflow direction) changes the path of the propeller slipstream 11 over the fuselage is modified. The angle of attack is continually changing as aircraft speed, weight and manoeuvre changes require different values of lift from the wing. With angle of attack change the position of the fin 15 and rudder 14 in the helical airflow 11 changes and therefore the side force on the fuselage and resulting aircraft yaw. At low engine power the maximum generated side force is low, therefore the variation between maximum and minimum force (and yaw) is small. As engine power levels increase the maximum yaw increases and therefore the variation between maximum and minimum. This means that at low speed and high power a change in angle of attack (to adjust pitch attitude or speed) can cause a significant change in heading. The yaw inducing the heading change also induces roll. So a change in one axis (pitch) has resulted in an undesired change in two different axes (yaw and roll). This makes aircraft control difficult.

As a propeller is efficient at low speed, high engine power gives a high thrust and in a light weight aircraft this gives a high acceleration. The role of a training aircraft is to teach inexperienced pilots to control all aspects of aircraft operation. When operating in a new environment it is advantageous if the surrounding does not change quicker than the student can appreciate and control. For example, after takeoff, the landing gear and flaps should be retracted before the limiting airspeed for each service is exceeded. For this reason a basic training aircraft should not accelerate too quickly.

With the above mentioned problems concerning aircraft control at low speed and high power it is clear that there are advantages to limiting maximum power at low speed to a manageable level. This power limitation could be achieved manually by the pilot restricting the forward movement of the power lever until it is safe to apply higher power, but this technique has the disadvantage that the pilot must continually monitor the power while the aircraft is accelerating, which would take his attention away from other important aspects of control in a rapidly changing environment. This would rapidly overload inexperienced pilots and might lead to accidents. A second problem is that all certification requirements must be met with the maximum achievable power and would therefore require significant airframe design modifications or compromises.

On some propeller-driven aircrafts a special contraption called trim aid device (TAD) is employed in order to suppress this effect of the helical propwash in cruise. The rudder is automatically deflected at a slight angle, in order to compensate for the yawing moment due to slipstream, as disclosed and claimed in the European patent with patent number EP 410 162-B1, filed on 2, Jul. 1990 and granted on 23, Sep. 1992. This European Patent is currently assigned to the assignee of the present patent application.

At low airspeeds and with very high engine power changes, the TAD effectiveness may be reduced or negated by insufficient rudder control authority.

Another control system for controlling a rudder in a propeller driven aircraft is described in U.S. Pat. No. 5,465,211. This U.S. patent is based on the European patent EP 410 162-B1 and proposes to employ a processor that computes a composite rudder trim control signal.

With increasing mechanical engine power, the yawing effect becomes critical. Since the yaw stability is an important issue, there is a need for controlling the yawing effect also for high-power propeller-driven aircraft. This can not be achieved with the known TADs.

SUMMARY

It is an object of the invention to provide a propeller-driven aircraft which has excellent stability at any speed.

It is still another object of the invention to provide a propeller-driven aircraft having minimal adverse yaw characteristics.

A scheme is provided for countering asymmetrical effects (direct and indirect effects) subjected onto a propeller-driven aircraft.

These and other objects of the invention are accomplished by a propeller-driven aircraft which comprises an engine providing mechanical engine power for rotating a propeller of the aircraft, an fuel scheduling unit for controlling the mechanical engine power of the engine, a system for measuring the airspeed and providing information concerning the airspeed to the fuel scheduling unit. The fuel scheduling unit automatically reduces the mechanical engine power at airspeeds below a certain first airspeed value.

The invention that this patent addresses allows to automatically schedule engine power as a function of aircraft forward speed without the need for the pilot to change the power lever position. The aim is that on the runway at zero forward speed the pilot can set the power lever to maximum and the engine control system will permit the engine to give only that power which gives an aircraft acceleration suitable for basic student training and also permits an easy control by limiting yaw and roll tendencies. As the aircraft accelerates, with no further movement of the power lever the engine control system will gradually permit engine power to increase. At a speed dictated by the maximum engine power and aircraft characteristics, the engine control system will permit the engine to attain its maximum power. The aircraft can then achieve the maximum speed that is possible with the maximum power of the engine.

The engine control system presented herein comprises an output connectable to the engine or an engine subsystem enabling the mechanical engine power of the engine to be adjusted, an input for receiving information concerning the airspeed from a system for measuring the airspeed, and means for automatically adjusting the mechanical engine power at airspeeds below a certain first airspeed value according to a pre-defined schedule.

A propeller-driven aircraft, according to the present invention, is stable about its yaw axis and shows minimal rotation around the yaw axis even if the engine power is changed or changes.

It is another advantage of a propeller-driven aircraft in accordance with the present invention that they are safer than conventional propeller-driven aircraft.

It is an advantage of the present invention that is allows propeller-driven aircrafts to be realized that are characterized by improved comfort for passengers, trainers, and pilots.

An advantage of this system for training is that the acceleration characteristic throughout the speed range is more like a jet aircraft than a conventional propeller powered one. In a conventional propeller aircraft with constant maximum power, propeller efficiency, and therefore thrust, drop rapidly as speed increases. With the proposed system the reduction in propeller efficiency is compensated for by increasing engine power. Therefore the rate of reduction of effective thrust, up to the point where maximum power is achieved, is similar to a jet engine.

It is an advantage of the propeller-driven aircraft presented herein that they have a reduced yawing moment and improved stability in landing configuration.

FIGURES

DETAILED DESCRIPTION

As stated above, a conventional propeller-driven aircraft is operated at a flat mechanical engine power. At the current rates of mechanical engine power, e.g., in the range of 1000 SHP, the yawing effect can more or less be controlled by the known TADs. Note that the mechanical engine power is the power being available at the propeller shaft.

At higher mechanical engine power, the yawing effect becomes a problem again. A high-power aircraft with the currently known TADs would in certain situations not be stable any more. A certification of such high-power aircraft would be difficult if not impossible.

Figure 1:
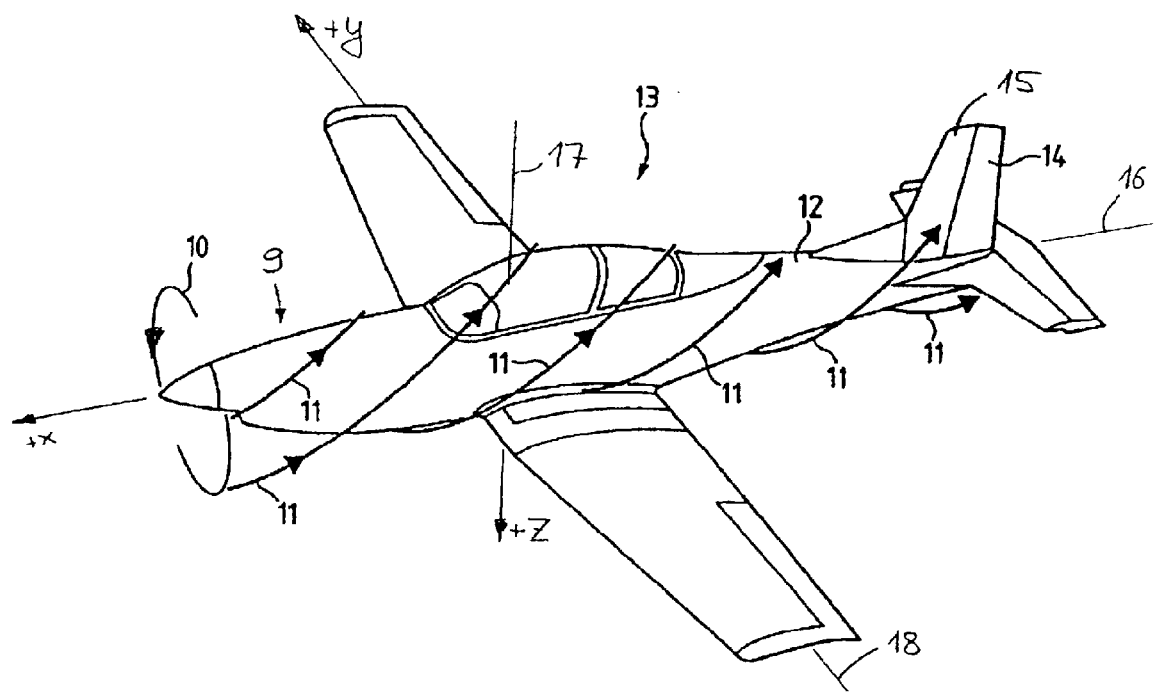
FIG. 1 Is schematic representation of a propeller-driven aircraft. The yawing effect around the yaw axis is illustrated in this Figure.

As discussed in the introductory part, each change in the engine power or torque induces an effect caused by the helical slipstream 11 (helical propwash) circulating around the aircraft body, as illustrated in FIG. 1.

Pilots must be aware of the affects that the angular momentum of the engine can have on an aircraft 13. Shown in FIG. 1 is an aircraft 13 with a tractor propeller 10 (located along the roll axis 16 of the aircraft 13). From the perspective of the pilot sitting inside, the propeller 10 turns clockwise.

On take-off, the pilot rotates the aircraft 13 about the lateral axis (pitch axis 18) by pulling back on the stick. Due to the change in slipstream impact on the vertical fin 15, the pilot feels that the aircraft 13 tries to turn itself around the yaw axis 17. The pilot has to manually compensate for it if the aircraft 13 is not fitted with a TAD providing for an automated compensation.

Before addressing the invention, some additional terms and expression are being defined.

The acceleration (herein referred to as level aircraft acceleration) is the rate of change of the speed and/or velocity with time.

The speed is the rate of movement or motion in a given amount of time. Speed is the term used when only the rate of movement is meant. When describing the aerodynamic behavior of an aircraft, one usually refers to the aircraft airspeed which is not the absolute speed of the aircraft in respect to the ground but the relative speed also taking the (wind) speed of the air into account.

Thrust is the force developed by the aircraft's propeller. It acts in the forward direction. Thrust must be greater than or equal to the effects of drag in order for flight to begin or be sustained.

As illustrated in FIG. 1, the roll axis 16 (sometimes referred to as longitudinal axis) is an imaginary reference line running down the center of the aircraft 13 between the nose 9 and fin 15. It is the axis about which roll occurs. Roll is the movement of the wing tips; one up and the other down.

The pitch axis 18 (lateral axis) is an imaginary reference line running parallel to the wings and about which pitch occurs. The up and down motion of the nose 9 of the aircraft 13 is called pitch.

The yaw axis 17 (vertical axis) is an imaginary reference line running from the top to the bottom of the aircraft 13. The movement associated with this axis is called yaw. Yaw is the drift, or right or left movement of the nose 9 of the aircraft 13.

Figure 2A:
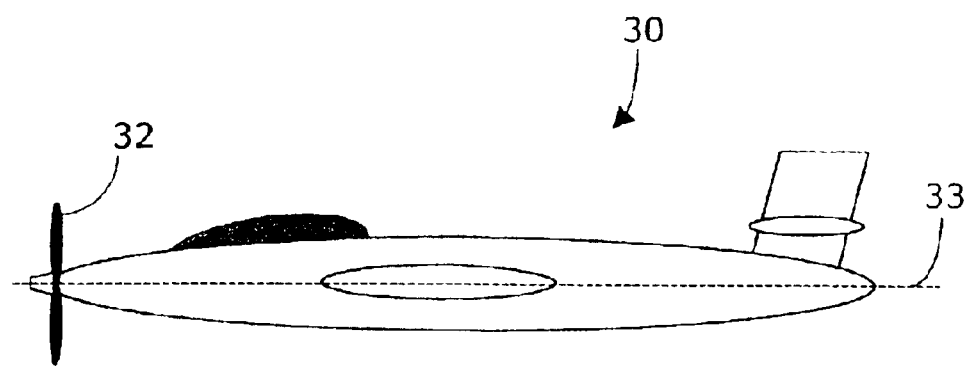
FIG. 2A Is a schematic representation of a propeller-driven aircraft in accordance with the present invention.
Figure 2B:
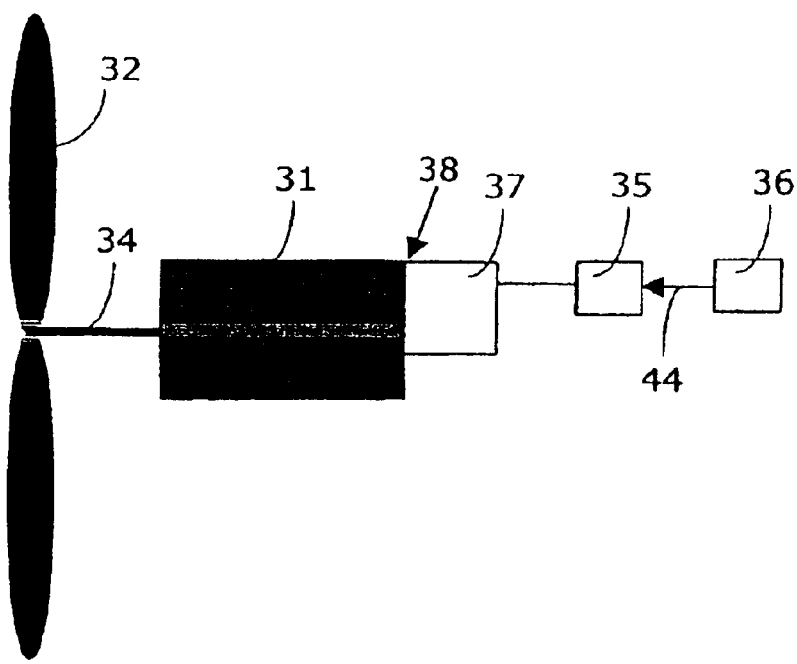
FIG. 2B Is a schematic representation of the engine, engine limiting unit and fuel scheduling unit of the propeller-driven aircraft of FIG. 2A.

An aircraft 30, according to the present invention, is illustrated in FIGS. 2A and 2B. The propeller-driven aircraft 30 comprises an internal combustion engine 31 providing mechanical engine power for rotating a propeller 32 around a roll axis 33 of the aircraft 30. In the present embodiment, the propeller 32 sits on a shaft 34. This shaft 34 is mechanically coupled to a rotating outlet shaft of the engine 31. A reduction gearbox may be employed to mechanically connect the rotating outlet shaft of the engine 31 with the propeller shaft 34.

The aircraft 30 comprises an engine control unit 37 with, for example, a known type microcomputer which comprises a RAM (random access memory), a ROM (read-only memory) and a CPU (central processing unit), all interconnected by a bus, e.g., a bi-directional bus. The engine control unit 37 performs the basic control of the engine 31, such as fuel injection control. In order to perform the engine control, various signals are fed to the engine control unit 37.

A mechanical or electrical throttle 38 is employed in the present example to control the setting of the engine control unit 37.

According to one embodiment of the present invention, the engine output (herein referred to as mechanical engine power) is controlled by adjusting the fuel and/or air to fuel mixture to the engine in the engine control unit 37 according to the cockpit inputs 38. According to the present invention, an aircraft airspeed system 36 is employed that allows to determine/measure the aircraft airspeed. Well suited is an Air Data Computer (ADC) or an Air Data Module (ADM) of conventional design. The aircraft airspeed system 36 provides an electrical signal representative of the airspeed via a connection 44 (e.g., a cable or bus) to the engine power-limiting unit 35 (herein after also referred to as engine limiting unit). Based on a pre-defined schedule, an engine limiting unit 35 allows to automatically limit the mechanical engine output power of the engine 31 by automatically altering the engine control unit 37 settings in order not to exceed the predefined maximum mechanical engine output limit.

Figure 3:
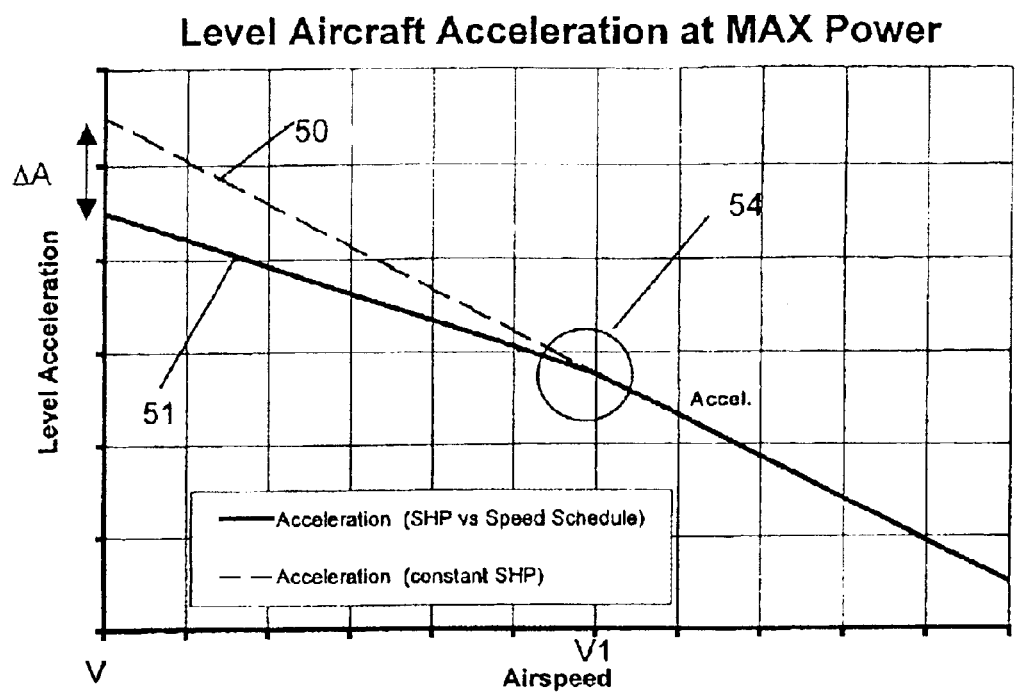
FIG. 3 Is a schematic diagram showing a level aircraft acceleration versus aircraft airspeed schedule, in accordance with the present invention.
Figure 4:
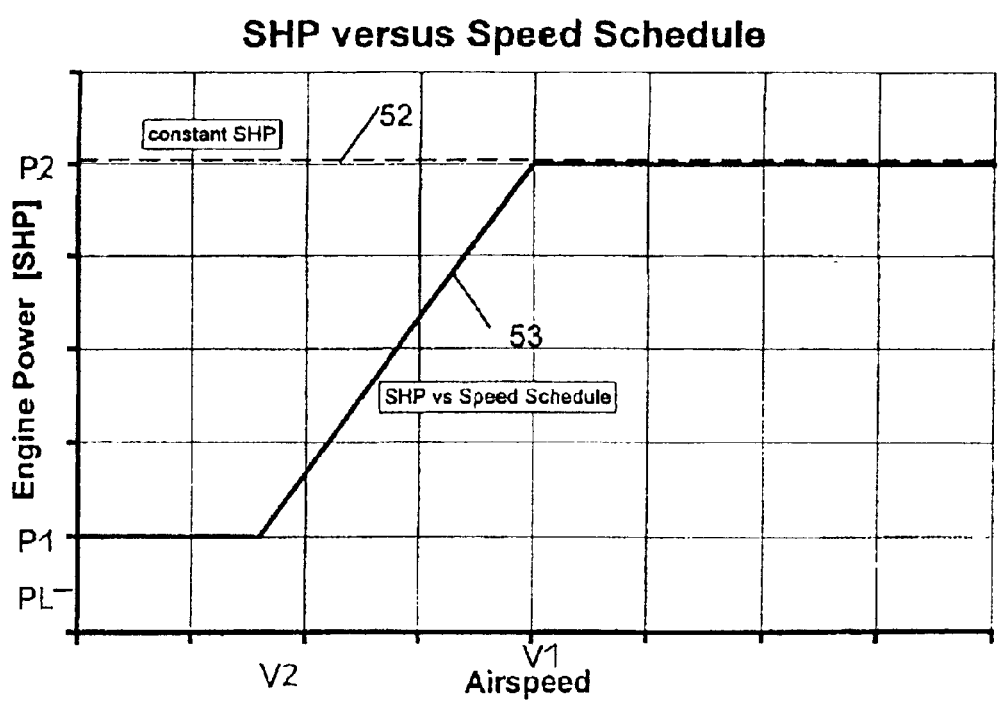
FIG. 4 Is a schematic diagram showing a mechanical engine power versus aircraft airspeed schedule, in accordance with the present invention.

According to the present invention, the engine limiting unit 35 automatically reduces the mechanical engine power at airspeeds below the first airspeed value V1 to achieve the reduced level aircraft acceleration of FIG. 3. The corresponding schedule (represented by the solid curve 53) for the reduction of the mechanical engine power is depicted in FIG. 4. As illustrated in this FIG. 4, the schedule provides for a first mode of operation where the mechanical engine power is kept constant at a value P1. If the airspeed V2 is reached, the mechanical engine power is steadily increased until it reaches at the airspeed value V1 the constant mechanical engine power P2. P2 may depend on the engine's mechanical power limit or the maximum mechanical engine power.

In order to allow a comparison with a conventional propeller-driven aircraft, a dashed curve 52 is plotted which illustrates that conventional aircraft is operated at a constant mechanical engine power P2.

By applying an appropriate schedule for the mechanical engine power versus aircraft airspeed, the acceleration behavior can be influenced. Due to the fact that the mechanical engine power of the aircraft 30 of the present embodiment follows the curve 53 having a first constant part at P1, a part where the mechanical engine power is steadily increased, and a second constant part where the mechanical engine power is P2, a smooth transition 54 of the level aircraft acceleration 51 at an airspeed at about V1 can be ensured.

With a level aircraft acceleration schedule 51, as for example depicted in FIG. 3, it can be ensured that a reduced yaw moment acts on the aircraft 30 while the engine control unit 35 automatically reduces the mechanical engine power (SHP) at airspeeds below the first airspeed value V1.

In a preferable implementation of the present invention, the engine limiting unit 35 operates the engine 31 of the aircraft 30 at low airspeeds at or above a lowest allowable mechanical engine power PL, as illustrated in FIG. 4. This lowest allowable mechanical engine power PL is defined such that sufficient mechanical engine power is available to safely operate the aircraft 30 in all conceivable situations.

It is an advantage of the present invention that the aircraft 30 presented herein reaches the same cruising aircraft airspeed (VC) as a conventional aircraft being operated at maximum mechanical engine power P2 in about the same time TC, as can be derived from the solid curve 51 representing the level aircraft acceleration versus time and the dashed curve 50 representing the level aircraft acceleration at maximum constant power.

The engine limiting unit 35 may connected to an electronic engine control, or it may be part of an electronic engine control, or it may be connected to a conventional hydro-mechanical fuel scheduling unit.

Figure 5A:
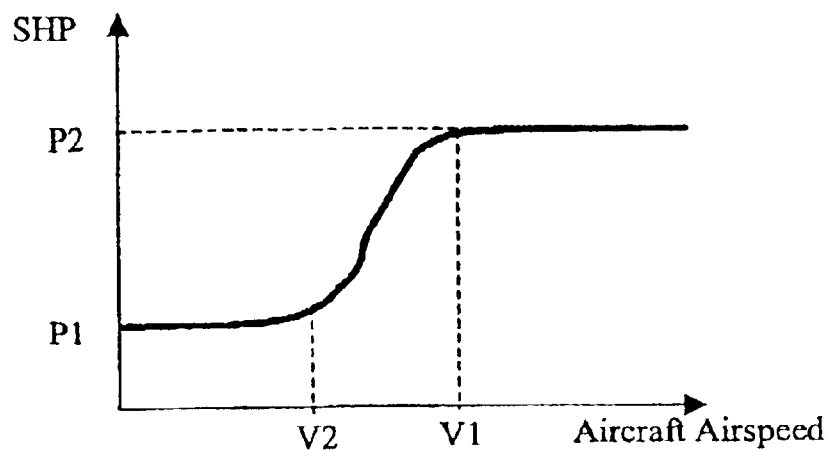
FIG. 5A Is a schematic diagram showing another mechanical engine power versus aircraft airspeed schedule, in accordance with the present invention.
Figure 5B:
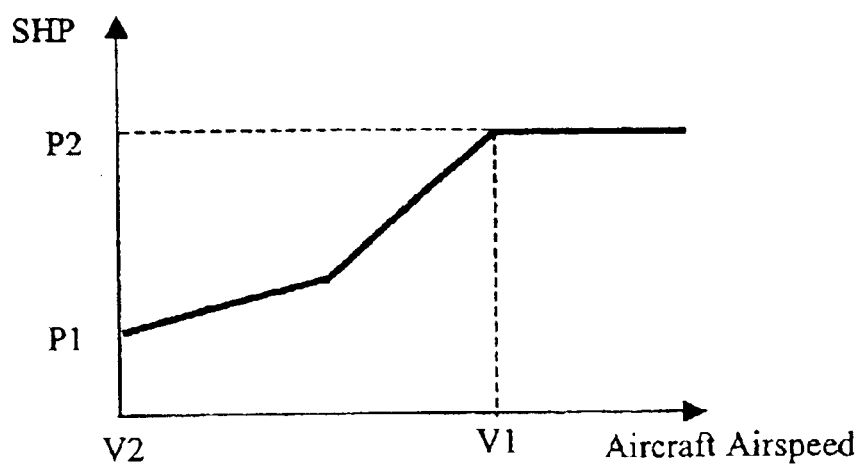
FIG. 5B Is a schematic diagram showing yet another mechanical engine power versus aircraft airspeed schedule, in accordance with the present invention.

Any other type of schedule defining the mechanical engine power (SHP) versus aircraft airspeed is possible. Two alternative examples 90 and 91 are shown in FIGS. 5A and 5B.

The engine limiting unit 35 may be adapted to in a manner that ensures a system default to be applied if the aircraft airspeed signal is lost, or if any other parameter indicates problems. In such situations, the engine 31 may be operated in a default where sufficient mechanical engine power is available for proper and safe operation. This default should be above the mechanical engine power PL (cf. FIG. 4).

In another embodiment of the present invention, the engine limiting unit 35 comprises a memory unit, e.g., a semiconductor memory, in which a particular SHP versus aircraft airspeed schedule or a particular level aircraft acceleration versus aircraft airspeed schedule is stored. The engine limiting unit 35 further comprises a processor that processes the actual aircraft airspeed—as measured by an aircraft airspeed system 36—together with the values given in the stored schedule in order to determine the appropriate SHP.

In yet another embodiment, the engine limiting unit 35 stores two or more schedules. The pilot may select an appropriate schedule. If the respective aircraft is to be used for the training of jet pilots, a jet-like schedule may be selected. When a beginner uses the aircraft, a special schedule may be selected that reduces all adversary yaw effects as much as possible while keeping the aircraft always in a safe mode of operation. Yet another schedule might be used when the aircraft is used for aerobatic maneouvers.

The present system might be combined with a conventional TAD to further improve the behavior of the aircraft. Altogether a behavior can be achieved where the yaw moment is negligible under all circumstances and in all situations.

The yawing effect on a multi-engined aircraft is less prominent, but the present invention can also be employed in aircraft with more than one engine.

Having described preferred embodiments of the invention, other embodiments incorporating its concepts will now be readily apparent to one of skill in the art. It is felt, therefore, that the invention should not be restricted to the disclosed embodiment, but, rather, should be limited only by the spirit and scope of the appended claims.

What is claimed is:

1. Propeller-driven aircraft comprising
   an engine providing mechanical engine power for rotating a propeller of the aircraft,
   an engine control unit for controlling the mechanical engine power output of the engine,
   an engine limiting unit,
   a system for measuring the airspeed and providing information concerning the airspeed to the engine limiting unit,
   wherein the engine limiting unit automatically alters the engine control unit settings according to a predefined schedule independent of pilot input thus reducing the mechanical engine power output at airspeeds below a certain first airspeed value in order to limit adverse effects of high engine torque at low airspeed.

2. The aircraft of claim 1, wherein a reduced yaw moment acts on the aircraft while the engine limiting unit automatically reduces the mechanical engine power at airspeeds below a certain first airspeed value.

3. The aircraft of claim 1 or 2, wherein the engine limiting unit automatically increases the mechanical engine power at airspeeds above a certain second airspeed value.

4. The aircraft of claim 3, wherein the engine limiting unit automatically increases the mechanical engine power applying a pre-defined schedule.

5. The aircraft of one of the preceding claims, wherein the engine limiting unit operates the engine at low airspeeds at or above a lowest allowable mechanical engine power, said lowest allowable mechanical engine power being defined such that sufficient mechanical engine power is available to safely operate the aircraft.

6. The aircraft of claim 3, wherein the engine limiting unit automatically increases the mechanical engine power until a maximum allowable engine power is reached.

7. The aircraft of claim 3, wherein the engine limiting unit automatically increases the mechanical engine power until the engine's mechanical power limit is reached.

8. The aircraft of one of the claims 1–4, wherein the engine limiting unit operates the engine at low airspeeds at a constant mechanical engine power.

9. The aircraft of one of the preceding claims, wherein the first airspeed value is in the range between 30 Knots and 250 Knots, preferably between 150 Knots and 220 Knots.

10. The aircraft of claim 1, enabled to accelerate with a level aircraft acceleration below the acceleration at maximum mechanical engine power while the engine limiting unit automatically reduces the mechanical engine power at airspeeds below a certain first airspeed value.

11. The aircraft of claim 1, wherein the aircraft reaches the same cruising airspeed as a conventional aircraft being operated at maximum mechanical engine power in about the same time.

12. The aircraft of claim 1, having an overall aircraft acceleration time to high aircraft speeds comparable to the overall aircraft acceleration time of a conventional aircraft being operated at maximum mechanical engine power.

13. The engine control system of claim 1, comprising a memory for storing the schedule.

14. The engine control system of claim 1, wherein the schedule either defines the mechanical engine power as a function of the airspeed, or the level aircraft acceleration as a function of the airspeed.

* * * * *